Patented May 16, 1939

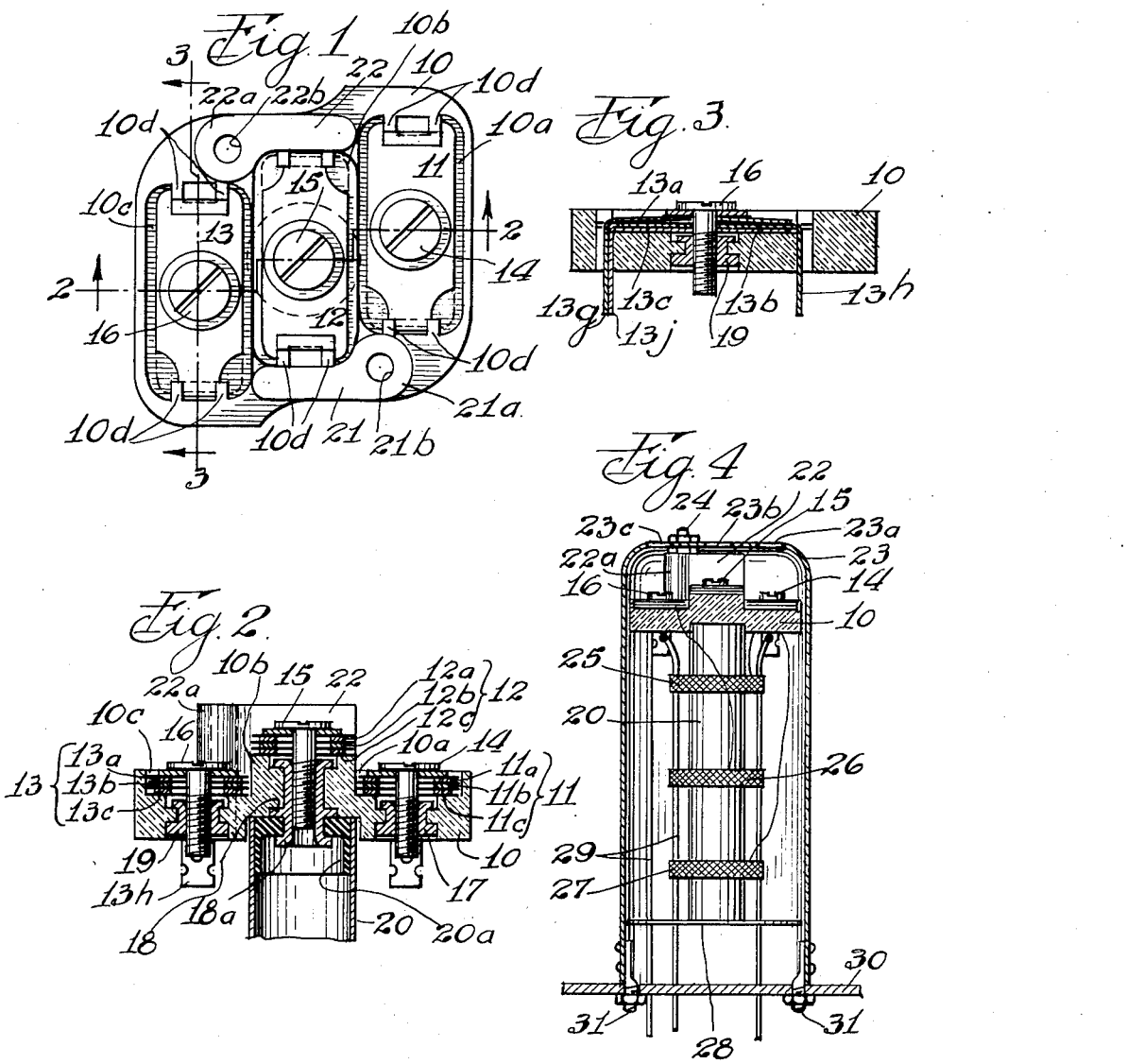

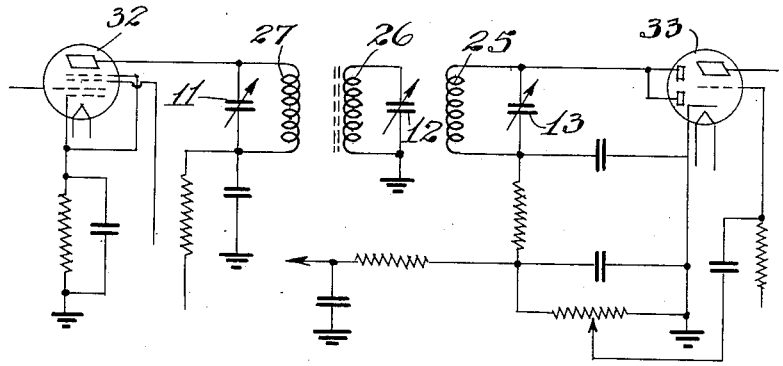
Fig. 5
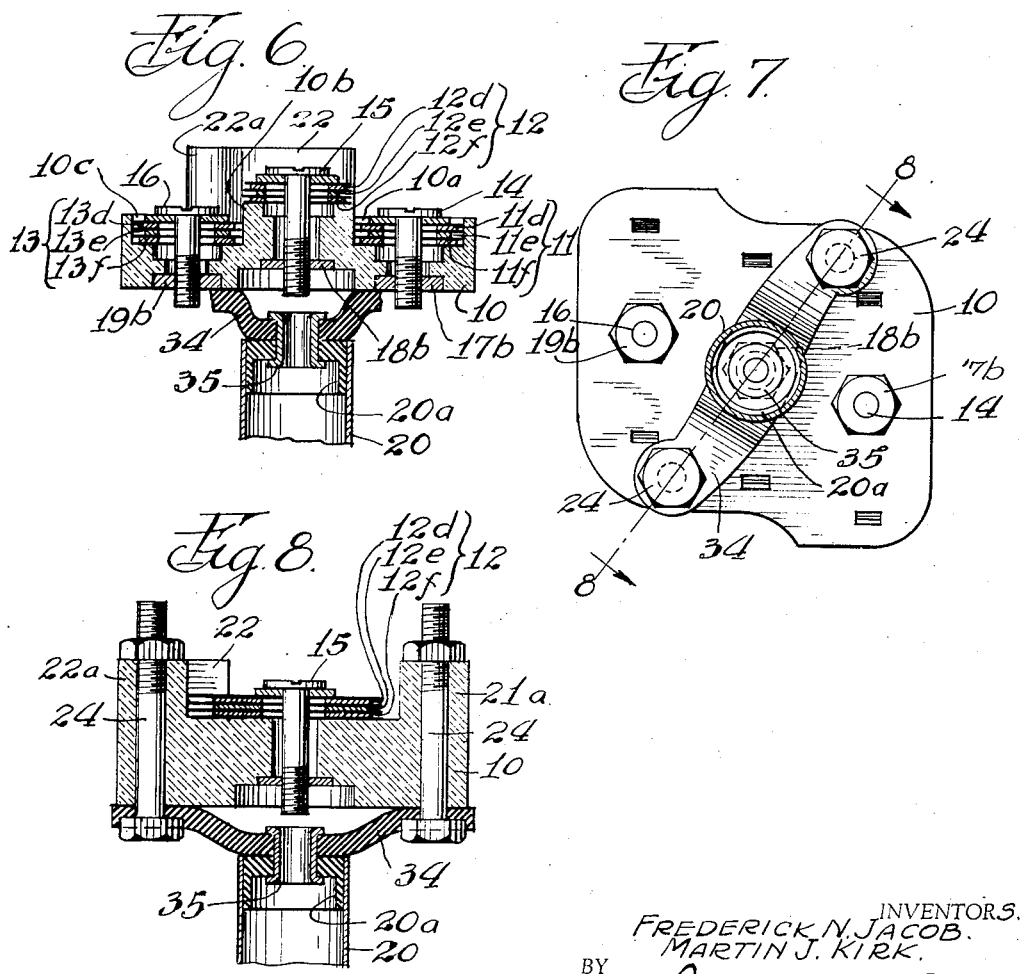
Fig. 6
Fig. 7
Fig. 8
INVENTORS.
FREDERICK N. JACOB.
MARTIN J. KIRK.
BY
Albert C. Bell
ATTORNEY.

2,158,127

UNITED STATES PATENT OFFICE 2,158,127

THREE-SECTION CONDENSER OF THE TRIMMER TYPE

Frederick N. Jacob and Martin J. Kirk, Chicago, Ill., assignors to Johnson Laboratories, Inc., Chicago, Ill., a corporation of Illinois Application August 5, 1937, Serial No. 157,538

10 Claims. (Cl. 175—41.5)

Our invention consists of a three-section condenser of the trimmer type for use with three-circuit coupling units, for example three-circuit intermediate frequency transformers.

Specifically, our invention consists of a condenser of the trimmer type, in which a mounting block of ceramic material is provided with three parallel surfaces or seats for supporting the plates of the several condenser units, the middle one of said seats being raised substantially above the level of the outer ones of said seats, the latter being preferably in substantially the same plane and depressed below the top surface of the insulating block. In this way, substantially the entire upper surface of the insulating block is used to support the plates of the condenser units, said plates may be of sufficient size even with an insulating block one and three-eighths inches square or less, to give each of the condenser units ample capacitance for tuning purposes, and yet the plates of the different condenser units are so related to each other, as to substantially eliminate coupling between them in use.

Generically, our invention consists of a condenser of the trimmer type, in which an insulating mounting block of suitable material is provided with condenser unit supporting surfaces or seats at different levels so that an edge of each seat may be in alignment vertically with the edge of an adjacent seat with substantially no capacitative coupling between the plates of the different condenser units on said seats.

Our invention also includes improved means for supporting the electrical coils with which the condenser units are connected in use, from the insulating block of the condenser.

Three-circuit coupling units, for example three circuit intermediate frequency transformers, are desirable in certain cases in radio receivers, to secure selectivity curves that have advantageous characteristics not readily secured in other ways, for example a selectivity curve having steep sides and a flat peak, so that although the unit is highly selective, it also includes side bands to a sufficient extent to impart a high degree of fidelity of operation to the unit. Such a coupling unit is generally shielded by mounting it in a shield can, and the condensers employed to tune the coils of the unit must also be mounted in the same can as the coils to facilitate construction and to secure efficient operation. Shield cans of the kind referred to are not required by present practice to be of large size to properly contain the coils themselves, for example a shield can 1⅜" square and not over 3½" long is adequate to effectively contain and shield the three coils of a three-circuit intermediate frequency transformer. In the past, where the tuning condensers for the three coils of such a unit have been mounted in the shield can of the unit, it has been necessary to either make the shield can substantially larger than 1⅜" square to receive the condenser assembly, or to mount one of the condenser constructions on the side wall of the can, thereby increasing the length of the can, or in other cases resorting to other arrangements both increasing the cross section and length of the can; for it is of course desirable to have the three condenser units mounted so that there is as small coupling between them as possible, resulting from the capacitative relation of the plates of one condenser unit to the plates of another condenser unit.

By our invention, we provide a novel form of condenser mounting block, to support the elements of the three condenser units in such a manner that with the condenser assembly supported in a shield can, all of the adjusting screws of the condenser units are readily available through the inner or unsupported end of the shield can, for adjustment purposes of the condenser units, and at the same time we are able to make the mounting block of such size that it will readily enter a small size shield can, for example a can that is 1⅜" square, without producing undesirable or detrimental capacitative coupling effects between the elements of any one of the condenser units and the elements of any other of the condenser units, in fact the capacitative effects between any one of the units of our three-section condenser and any other of said units, is substantially zero.

Our invention will be best understood by reference to the accompanying drawings illustrating a preferred embodiment thereof, in which Fig. 1 shows our condenser assembly in plan view to an enlarged scale, Fig. 2 is a horizontal, sectional view through the construction shown in Fig. 1 taken along the line 2—2 in Fig. 1, Fig. 3 is a vertical, sectional view through the construction shown in Fig. 1, taken along the line 3—3 in Fig. 1, Fig. 4 is a vertical, sectional view through the shield can of a three-circuit coupling unit of which our condenser construction is a part, Fig. 5 is a diagrammatic circuit drawing of an illustrative use of the coupling unit shown in Fig. 4, Fig. 6 shows in a view similar to Fig. 2, a similar condenser structure modified in certain features of its construction, Fig. 7 shows in bottom view the condenser construction illustrated in Fig. 6, and Fig. 8 is a vertical sectional view of the condenser construction illustrated in Figs. 6 and 7, taken along the line 8—8 in Fig. 7.

Similar numerals refer to similar parts throughout the several views.

As shown in Fig. 1, our three-section condenser assembly consists of a block 10 of suitable insulating material, for example vitreous or ceramic material, on the upper portion of which three condenser units 11, 12 and 13 are mounted in parallel relation. As shown in Fig. 2, the condenser unit 11 includes an upper metallic plate 11a, an intermediate metallic plate 11b and a lower metallic plate 11c insulated by thin sheets of suitable material, for example mica. The plates of the condenser unit 11 are mounted in a rectangular recess 10a in the upper surface of the block 10 and on the other side of the block a similar recess 10c is formed to similarly contain the similar plates 13a, 13b and 13c of the condenser unit 13. Between the recesses 10a and 10c, the block 10 is provided with an upwardly projecting rectangular portion 10b extending from front to rear of the block, to support the metallic plates 12a, 12b and 12c of the condenser unit 12, the elevation of the top of said projection above said recesses, being as shown in Fig. 2, equal substantially to half the width of the latter condenser plates. These proportions are illustrative only and may be modified to suit the requirements of any particular case. One or more of the metallic plates of each of the condenser units is bent to arcuate form in a manner well known in trimmer condenser construction, so that the capacitance of each condenser unit may be changed as desired by pressing the outer metallic plate of the condenser unit towards the other plates thereof against the spring action of the bent plate or plates, which capacitance adjustment is effected in our condenser construction by the screws 14, 15 and 16 extending through clearance openings in the respective condenser plates therefor, which screws extend through threaded bushings 17, 18 and 19 secured in the lower portion of the block 10. The bushing 18 is preferably provided with a downwardly extending cylindrical extension 18a, formed over and rigidly holding a cup 20a of insulating material, to which cup an insulating tube 20 is secured, for example, by cement, to support the coils of the coupling unit with which the condenser units are to be used, from the block 10.

The front and rear edge portions of the top of the block 10 are provided with vertical spacing extensions 21 and 22 at the ends of the projecting portion 10b, to engage the inner surface of the inner end of a shield can in mounting the condenser assembly in the can, so as to maintain a sufficient spacing between the end wall of the can and the parts of the condenser unit 12, to prevent shorting and undesirable capacitative effects between said condenser unit and the can. The spacer extension 21 is provided with an enlargement 21a at one end of the condenser unit 11, and the spacer extension 22 is provided with an enlargement 22a at the opposite end of the condenser unit 13, which enlargements contain bores 21b and 22b to receive screw studs for securing the block 10 to the inner end wall of a shield can. To accommodate the enlargements 21a and 22a, the recesses 10a and 10c are offset or staggered from front to rear of the block 10, so that the condenser unit 13 extends from adjacent the front edge of the block 10 to the enlargement 22a, while the condenser unit 11 extends from adjacent the rear edge of the block 10 to enlargement 21a, the condenser unit 12 being in a position from front to rear of the block 10, that is intermediate the positions occupied by the condenser units 11 and 13.

As shown for the condenser unit 13 in Fig. 3, the metallic plate 13a is provided with a connection terminal 13g extending through a suitable aperture in the block 10 and from the bottom surface thereof for electrical connection purposes, the plate 13b is provided at the other end of the condenser unit, with a similar connection terminal 13h, and the plate 13c is provided with a similar connection terminal 13j adjacent and in contact with the connection terminal 13g, since the plates 13a and 13c are usually electrically connected to the same part of the circuit, for example to ground. The condenser units 11 and 12 are provided with similar connection terminals, excepting that the said terminals for the condenser unit 12 are preferably reversed from end to end relatively to the connection terminals from the condenser unit 13, and the connection terminals from the condenser unit 11 are preferably in the same relation from front to rear of the block 10 as the connection terminals of the condenser unit 13, to sepaarte the live leads of the condenser units as much as possible, which live connection terminals extend from the metal plates 11b, 12b and 13b of the condenser units. The block 10 is preferably provided with lugs 10d for each of the condenser units, to engage the ends of the condenser plates and hold them in proper alignment with each other.

It will be noted that the arrangement of the enlargements 21a and 22a described, locates the bores 21b and 22b in a diagonal line across the face of the block 10 extending through the axis of the screw 15, which screw is centered from side to side and from front to rear of the mounting block 10. This results in a balanced condition of the forces involved in securing the block 10 to a shield can containing the block, although one of the bores 21b and 22b is on one side of the block and the other of the bores is on the other side of the block, to effectively utilize the surface of the block for condenser mounting in the manner above described.

It will be noted as a result of the construction described, that the bottom metallic plate 12c of the condenser unit 12 is supported in a plane which is substantially above the top plate 11a and the top plate 13a of the condenser units 11 and 13 respectively, the amount of this separation being such that there is substantially no capacitative effect between the condenser unit 12 and either of the condenser units 11 and 13 when the device is in operation. It will further be observed that although the condenser units 11 and 13 are mounted in substantially the same plane, their metallic plates are so widely separated by the projecting portion 10b, that there is substantially no capacitative effect between said condenser units 11 and 13. It will also be observed that as a result of the construction described, one of the side edges of each of the metallic plates 12a and 12c of the condenser unit 12, is nearly in line vertically with the inner side edges of the plates 11a and 11c of the condenser unit 11, and that a similar relation exists between the other side edges of the plates 12a and 12c of the condenser unit 12 and the inner side edges of the plates 13a and 13c of the condenser unit 13; as a result, bearing in mind that in the use of the device the top and bottom plates of one or more of the condenser units are substantially at ground potential, and that the mid-plates of the several condenser units must be prevented as far as possible from having capacitative effects with each other, it will be observed that the mid-metallic plate 12b of the condenser unit 12 is substantially shielded from capacitative effect with the mid-plate of each of the condenser units 11 and 13, by the grounded plate 12c and in many cases also by the grounded plates 11a and 13a.

In the manner described, the entire surface of the mounting block is effectively used to support the condenser units, and the plates of each unit are prevented from having detrimental capacitative interaction with the plates of either of the other units, and yet at the same time the mounting block may be of small length and breadth, and need be but a small amount thicker than would be required for a two-section condenser assembly.

In Fig. 4 we illustrate a coupling unit employing our improved condenser assembly, in which the condenser mounting block 10 is mounted in place in a shield can 23 by screw studs 24, the coil insulating support 20 having mounted thereon inductively related coils 25, 26 and 27, said mounting support carrying at its lower end an insulating disc 28 centering the support 20 in the can 23 and holding the connecting wires 29 fixedly in place relatively to each other. The can 23 is shown as secured to a panel or mounting plate 30 by screws 31 at the outer end of said can, the inner end of the can being provided with apertures 23a, 23b and 23c in line with the adjusting screws 14, 15 and 16, to facilitate adjusting the latter screws.

As illustrative of an advantageous use of our three-section condenser described, we show in Fig. 5 diagrammatically, the operating circuit of a three-circuit intermediate frequency transformer in which the primary coil 27 is tuned by the condenser unit 11, said coil receiving high frequency current from a vacuum tube 32; the intermediate or tertiary coil 26 of the transformer is connected with and tuned by the condenser unit 12, one end of this resonant link circuit being grounded as indicated; and the secondary coil 25 of the transformer is tuned by the condenser unit 13, one end of this resonant circuit being connected to ground through the resistances and capacitors indicated, and the high potential terminal of the secondary coil being connected with a diode detector tube 33 from which current at audio frequency is delivered for subsequent use as desired. The coils 27 and 26 are inductively related, as are also the coils 26 and 25, and the result of tuning these coils to a desired intermediate frequency is to produce a selectivity curve having steep sides and a flat peak, which insures a high degree of selectivity and also a high degree of retention of the side bands, the particular form of the selectivity curve being determined by the proportioning of the coils and their coupling determined by the mounting of the coils relatively to each other. The three-circuit transformer illustrated is effective either with air cores or with powdered iron cores, depending upon the particular results desired.

In the modified construction illustrated in Figs. 6, 7 and 8, the condenser block 10 may be the same as above described, the condenser units 11, 12 and 13 differing only in that the top and bottom condenser plates 11d and 11f of the unit 11, the top and bottom plates 12d and 12f of the unit 12, and the top and bottom plates 13d and 13f of the unit 13, are somewhat wider than and project at their edges beyond the edges of the middle plates 11e, 12e and 13e respectively, the latter plates being of substantially the same size as each other, and also of the same size as the plates 11b, 12b and 13b above described. This construction completely shields the middle plates of the adjacent condenser units from the possibility of straight-line capacitative interaction with each other, and capacitative coupling between said middle plates in use, is so reduced as to be inappreciable.

As shown in Fig. 6, the threaded bushings 17, 18 and 19 above described, are omitted, and hexagonal nuts 17b, 18b and 19b are employed to engage the threads on the adjusting screws 14, 15 and 16 respectively. This arrangement simplifies and cheapens the construction, it is effective in use, and is possible, particularly as to the bushing 18, on account of the means employed to mount the coil support 20.

As shown in Figs. 7 and 8, a bracket 34 of suitable insulating material, such as fibre or the equivalent, is held diagonally on the bottom surface of the block 10, by the screw studs 24 extending through the ends of said bracket, said studs having flat-sided heads embedded sufficiently in said bracket, to prevent turning of the studs. As a result, securing said studs to the block 10 by suitable nuts, also secures said bracket in place on said block. The mid-portion of the bracket 34 is off-set away from the block 10 to avoid the possibility of interference with the adjusting screw 15, and at the mid-point of the bracket, a cup 20a above described, is secured to the bracket in any desired manner, for example, by a rivet 35. The coil support 20 is secured to the cup 20a, for example, by cement, and the remainder of the construction may be the same as above described, with the same mode of operation and advantages.

To appreciate the problems involved in producing a three-section condenser of the kind described, some of the practical limitations may be considered. The adjusting screws 14, 15 and 16 cannot safely be smaller than #4 having an outside diameter of .112 of an inch; a substantial clearance must be provided around the screws through the condenser plates, to avoid short-circuiting and undesirable interaction through the screws; to effect such clearance, openings through the plates not less than $\frac{3}{16}$ of an inch wide, are required, giving a clearance between the edge of the opening and the screw, of .038 of an inch if the screw is exactly centered, and less where the plates have small lateral movement, as is always the case, relatively to their aligning structures; on either side of said clearance openings, the plates must have sufficient width to afford a positive spring action to the arcuated plates; where, as in the present case, the plates are $\frac{1}{2}$ of an inch wide, the width between the clearance opening and each outer edge of the plate is .078 of an inch, a width which cannot safely be decreased with any certainty that the adjustment of the condenser will function properly; with plates $\frac{1}{2}$ of an inch wide, and with the supporting surface or seat $\frac{27}{64}$ of an inch wide as in the present case, the excess width of the seat at each edge of the plates is only about .039 of an inch, which is no more than desirable to protect the edges of the thin mica sheets extending beyond the plates; to permit the block 10 to enter freely into a shield can 1⅜ inches square and of a length determined by the coupling unit as a whole, the block cannot be larger than 1½ inches square, and this and the three seats, each ²⁷⁄₆₄ of an inch wide, limit the flanges at the outer edges of the outer seats, to a thickness (in the direction of the width of the block), of about .039 of an inch each, which cannot be decreased with any certainty of properly making said flanges of ceramic material. Condenser plates of the size described, are found to be large enough for the purposes described, but for the reasons pointed out they cannot be made narrower practically, and obviously if they were placed side by side in the same plane, on a block of the size described, the lateral separation of .078 of an inch between the plates of adjacent condenser units, would result in serious undesirable interaction between the condenser units, a condition entirely overcome by our invention without requiring the use of a larger shield can.

Our condenser construction described may be used effectively in any case where a three-section condenser of the trimmer type is desired, and it is particularly applicable where the condenser assembly must be of small size and free from appreciable capacitative effects between its several units.

While we have shown our invention in the particular embodiment described, we do not limit ourselves thereto, as we may employ equivalents thereof without departing from the scope of the appended claims.

What we claim is:

1. In a condenser of the trimmer type, the combination of a mounting block of insulating material having in its upper surface two side recesses of rectangular conformation separated by a rectangular projection extending from front to rear of said block, condenser units mounted in said recesses and on said projection, each of said condenser units including insulated metallic plates and an adjusting screw extending through said plates, and bushings carried by said block and having threaded engagement with said screws, the elevation of said projection above said recesses being sufficient to substantially eliminate coupling between the active portions of the middle and side condenser units, whereby capacitative effects between the several condenser units are of inappreciable amount, said block having a first vertically extending bored enlargement at the front end of one of said recesses and a second and similar enlargement at the rear end of the other of said recesses, said bored enlargements being for mounting purposes and symmetrically disposed relatively to the center of said block, said recesses being offset from front to rear of the block and relatively to each other to accommodate said enlargements.

2. In a condenser of the trimmer type, the combination of a mounting block of insulating material having in its upper surface two side recesses of rectangular conformation separated by a rectangular projection extending from front to rear of said block, condenser units mounted in said recesses and on said projection, each of said condenser units including insulated metallic plates and an adjusting screw extending through said plates, and bushings carried by said block and having threaded engagement with said screws, the elevation of said projection above said recesses being sufficient to substantially eliminate coupling between the active portions of the middle and side condenser units, whereby capacitative effects between the several condenser units are of inappreciable amount, each of said condenser units including top and bottom plates and a middle plate narrower than said top and bottom plates, thereby electrostatically shielding the middle plate of each unit from the middle plate of an adjacent unit.

3. In a condenser of the trimmer type, a combination of an insulating mounting block having supporting surfaces at different elevations, and condenser units mounted on said surfaces, the difference in elevation of said surfaces effecting inappreciable capacitative effects between said units, each of said units including metallic plates, at least one plate of one unit being extended laterally beyond a second plate of said one unit, thereby electrostatically shielding said second plate from a plate of another of said units.

4. In a condenser of the trimmer type, the combination of an insulating mounting block having three parallel supporting surfaces, the middle one of said surfaces being at a different elevation from the others of said surfaces, and condenser units mounted on said surfaces, the difference in elevation of said surfaces effecting substantially zero coupling electrostatically between said units, each of said units including metallic plates, the high potential plate of each unit being narrower than and overlapped by a low potential plate of said unit, thereby electrostatically shielding said active plates from each other.

5. In a condenser of the trimmer type for radio use, the combination of a plurality of separate condenser units each including metallic plates insulated from each other, said units having adjacent and spaced edge portions and having their plates in planes substantially parallel with each other, the active plate of a first one of said condenser units being in an upper plane, the active plate of a second one of said condenser units being in a lower plane, and one of the inactive plates of said first and second units being in an intermediate plane between said upper and said lower planes, and a block of insulating material supporting said condenser units, the vertical spacing of said upper and said lower planes being substantially greater than the spacing horizontally of the adjacent edge portions of the plates of said first and said second units, the vertical spacing of said upper and said lower planes and the shielding effect of said inactive plate substantially eliminating coupling between the adjacent edge portions of said active plates.

6. In a condenser of the trimmer type for radio use, the combination of a plurality of separate condenser units each including metallic plates insulated from each other, said units having adjacent and spaced edge portions and having their plates in planes substantially parallel with each other, the active plate of a first one of said condenser units being in an upper plane, the active plate of a second one of said condenser units being in a lower plane, and one of the inactive plates of said first and second units being in an intermediate plane between said upper and said lower planes, and a block of insulating material supporting said condenser units, the vertical spacing of said upper and said lower planes being substantially greater than the spacing horizontally of the adjacent edge portions of the plates of said first and said second units, the vertical spacing of said upper and said lower planes and the shielding effect of said inactive plate substantially eliminating coupling between the adjacent edge portions of said active plates, each of said units having a screw extending through its plates for adjusting the capacitance of said unit.

7. In a condenser of the trimmer type for radio use, the combination of three separate condenser units each including active and inactive metallic plates insulated from each other, said units having adjacent and spaced edge portions and having their plates in planes substantially parallel with each other, the active plate of a first one of said condenser units being in a first plane, the active plate of each of the others of said condenser units being in a second plane spaced vertically from said first plane, and at least one of the inactive plates of said units being in a position between said first and said second planes shielding an active plate in one of said planes, and a block of insulating material supporting said condenser units, the vertical spacing of said first and said second planes being substantially greater than the spacing horizontally of the adjacent edge portions of the plates of said units, the vertical spacing of said planes and the said shielding effect substantially eliminating coupling between the adjacent edge portions of said active plates.

8. In a condenser of the trimmer type for radio use, the combination of three separate condenser units each including active and inactive metallic plates insulated from each other, said units having adjacent and spaced edge portions and having their plates in planes substantially parallel with each other, the active plate of a first one of said condenser units being in a first plane, the active plate of each of the others of said condenser units being in a second plane spaced vertically from said first plane, and at least one of the inactive plates of said units being in a position between said first and said second planes shielding an active plate in one of said planes, and a block of insulating material supporting said condenser units, the vertical spacing of said first and said second planes being substantially greater than the spacing horizontally of the adjacent edge portions of the plates of said units, the vertical spacing of said planes and the said shielding effect substantially eliminating coupling between the adjacent edge portions of said active plates, said block having a central projecting portion supporting the central one of said units in raised position.

9. In a condenser of the trimmer type for radio use, the combination of three separate condenser units each including active and inactive metallic plates insulated from each other, said units having adjacent and spaced edge portions and having their plates in planes substantially parallel with each other, the active plate of a first one of said condenser units being in a first plane, the active plate of each of the others of said condenser units being in a second plane spaced vertically from said first plane, and at least one of the inactive plates of said units being in a position between said first and said second planes shielding an active plate in one of said planes, and a block of insulating material supporting said condenser units, the vertical spacing of said first and said second planes being substantially greater than the spacing horizontally of the adjacent edge portions of the plates of said units, the vertical spacing of said planes and the said shielding effect substantially eliminating coupling between the adjacent edge portions of said active plates, said block having a central projecting portion supporting the central one of said units in raised position, and the outer ones of said units being supported by said block at substantially the same elevation as each other.

10. In a condenser of the trimmer type for radio use, the combination of three separate condenser units each including active and inactive metallic plates insulated from each other, said units having adjacent and spaced edge portions and having their plates in planes substantially parallel with each other, the active plate of a first one of said condenser units being in a first plane, the active plate of each of the others of said condenser units being in a second plane spaced vertically from said first plane, and at least one of the inactive plates of said units being in a position between said first and said second planes shielding an active plate in one of said planes, and a block of insulating material supporting said condenser units, the vertical spacing of said first and said second planes being substantially greater than the spacing horizontally of the adjacent edge portions of the plates of said units, the vertical spacing of said planes and the said shielding effect substantially eliminating coupling between the adjacent edge portions of said active plates, each of said units having a screw extending through its plates for adjusting the capacitance of said unit.

FREDERICK N. JACOB.
MARTIN J. KIRK.

CERTIFICATE OF CORRECTION.

Patent No. 2,158,127.   May 16, 1939.

FREDERICK N. JACOB, ET AL.

It is hereby certified that error appears in the printed specification of the above numbered patent requiring correction as follows: Page 2, second column, line 5, before the word "enlargement" insert the; line 31, for "sepaarte" read separate; page 4, second column, line 12-13, claim 3, for "a combination" read the combination; and that the said Letters Patent should be read with this correction therein that the same may conform to the record of the case in the Patent Office.

Signed and sealed this 4th day of July, A. D. 1939.

Henry Van Arsdale (Seal)   Acting Commissioner of Patents.